Patented Mar. 9, 1937

2,073,427

UNITED STATES PATENT OFFICE 2,073,427

METHOD OF CLEANING AND POLISHING TIN PLATE

Eugene X. Riley, Sparrows Point, Md.

No Drawing. Application October 31, 1936, Serial No. 108,641

2 Claims. (Cl. 51—280)

The object of my invention is to provide a composition for the purpose of cleaning and polishing tin-plate.

My composition consists of a mixture of wheat middlings, rye middlings and diatomaceous earth.

In preparing the composition, I prefer to use the ingredients in about the following proportions, viz: 74 pounds of wheat middlings, 24 pounds of rye middlings and one pound of diatomaceous earth. Good results may be obtained, however, by varying the proportions of the ingredients.

The ingredients are thoroughly mixed in any suitable manner, and by frictional contact with the surface of the tin-plate will thoroughly clean and polish the same.

I claim:

1. A composition for cleaning and polishing tin-plate, comprising wheat middlings, rye middlings and diatomaceous earth.

2. A composition for cleaning and polishing tin-plate, comprising 74 pounds of wheat middlings, 24 pounds of rye middlings and one pound of diatomaceous earth.

EUGENE X. RILEY.